3,549,343
METHOD FOR REMOVING TIN FROM FLAT GLASS
David Gordon Loukes, "Kenwyn" 17 Broom Close, Eccleston Park, Prescot, Lancashire, England, and John Henry Morgan, 61 Thorton Road, Chelwood Ave., Liverpool, 16 Lancashire, England
No Drawing. Continuation-in-part of application Ser. No. 465,721, June 21, 1965. This application Jan. 27, 1969, Ser. No. 794,377
Int. Cl. C03c 17/22
U.S. Cl. 65—30         6 Claims

ABSTRACT OF THE DISCLOSURE

Flat glass which has been in contact with molten tin and has thereby acquired a stannous oxide content in its surface, is treated while still hot with a gaseous reagent comprising chlorine, to vaporize the tin content from the glass surface.

CROSS-REFERENCES TO RELATED APPLICATIONS

This application is a continuation-in-part of our copending application Ser. No. 465,721 filed June 21, 1965, now abandoned.

BACKGROUND OF THE INVENTION

(1) Field of the invention

This invention relates to flat glass and more especially to the manufacture of float glass.

(2) Description of the prior art

In the manufacture of float glass in which glass is in contact with a molten metal, the molten metal employed is such as to have all the characteristics fully described in U.S. Pat. No. 3,083,551. Preferably the metal used in constituting the bath is a tin or an alloy of tin having a specific gravity greater than that of the molten glass.

In the course of manufacture the surface of the float glass which has been in contact with molten tin may acquire impurities from the molten tin, for example a percentage of stannous oxide may be present in the glass surface. For some applications of the glass, for example where the glass is heated in the presence of oxygen, as occurs when the glass is to be bent or toughened, the presence of stannous oxide in the glass surface may lead to undesirable results due to a modification of the glass surface as the stannous oxide changes to stannic form.

It is a main object of the present invention to render harmless such impurities present in the surface of glass which has been in contact with molten tin.

SUMMARY

According to the invention there is provided in the manufacture of flat glass during which the glass is in contact with molten tin and thereby acquires in its surface a stannous oxide content, the step of treating that surface, while the temperature of the glass is in the range 700° C. to 400° C., with a gaseous reagent selected from the group consisting of chlorine, hydrogen chloride gas, and gaseous metal chlorides, and vaporizing the tin from the glass surface in the form of tin chloride.

The present invention has particular application in improving the surface characteristics of float glass which is manufactured in ribbon form on a bath comprising molten tin by the method described and claimed in United States Pat. No. 3,083,551.

DESCRIPTION OF THE PREFERRED EMBODIMENTS

Example 1

A ribbon of float glass was manufactured on a bath of molten tin in accordance with the process described in United States Pat. No. 3,083,551. After the glass ribbon was removed from the bath at a temperature of about 650° C. at which the viscosity of the glass is about $10^7$ poises, the ribbon was immediately passed over a zinc chloride melt maintained at 400° C. Cooling of the ribbon continued after it had left the bath of molten tin and the glass ribbon passing over the zinc chloride melt was at a temperature of approximately 600° C. The lower surface of the glass ribbon which had been in contact with the molten tin contained harmful impurity in the form of stannous oxide, and this tin-contaminated surface was passed over the zinc chloride melt at a distance of approximately one inch above the surface of the melt. The zinc chloride melt extended beneath the whole width of the glass ribbon.

At about 400° C. zinc chloride has a vapor pressure of about 1 mm. of mercury so that zinc chloride vapor was maintained in the atmosphere through which the glass ribbon passed. At the rate at which the glass ribbon was advanced through the zone in which the zinc chloride melt was present, each length of the surface of the glass ribbon was in the zone where the zinc chloride vapor was present for a time rather less than 1 minute.

The zinc chloride vapor reacted with the stannous oxide in the glass surface to form volatile tin chloride. The tin in the glass surface was thus vaporized in the form of tin chloride into the atmosphere above the melt and this reaction at the glass surface had no adverse affect on the quality of the glass which could be heated in oxygen-containing atmosphere prior to toughening without the development of undesirable characteristics in the glass surface.

The glass ribbon emerging from the treatment zone was then passed into an annealing lehr. Finally the annealed ribbon of glass was removed from the lehr and was washed with water to remove from its lower surface any slight film of zinc chloride present on that lower surface.

The lower surface of the glass ribbon after washing maintained the high polish and lustre equivalent to that known as "fire finish" which is characteristic of float glass manufactured on a bath of molten metal. The glass ribbon was subsequently cut into sheets of glass and individual sheets were subjected to a heat treatment process in the atmosphere, for example prior to a bending or toughening process. Both surfaces of the sheet of float glass maintained their excellent qualities after this heating.

Example 2

A process similiar to that described in Example 1 was carried out and in this case the ribbon of glass taken from the bath of molten tin at about 650° C. was immediately fed into an annealing lehr. A zone of the lehr was defined at the inlet end and a zinc chloride melt was maintained in this zone at 400° C. The atmosphere in the zone was nitrogen and the rate of flow of nitrogen into the hot end of the lehr was about 5 litres per minute.

Any stannous oxide in the undersurface in the ribbon of glass was vaporized in this zone due to the reaction of the gaseous zinc chloride with the lower surface of the glass, and the annealed glass ribbon removed from the lehr was found to be coated slightly with a film of zinc chloride which was removed easily by washing with hot water.

Again beneficial effects were found in that the excellent float qualities of both surfaces of the glass were maintained after a subsequent heat treatment in an oxygen-containing atmosphere.

The actual treatment given to the lower surface of the glass ribbon in Examples 1 and 2 was varied in accordance with the degree of tin contamination of the lower surface of the glass ribbon taken from the bath. Thus to maintain a higher concentration of zinc chloride vapor in the atmosphere the temperature of the zinc chloride melt was raised for example to 450° C. or 500° C. For a lighter treatment the vapor pressure of the zinc chloride vapor was reduced by lowering the temperature of the melt, for example to 350° C.

In the method described in Example 2 further control was achieved by adjusting the rate of flow of nitrogen into the treatment zone at the hot end of the lehr.

Example 3

A ribbon of float glass was manufactured on a bath of molten tin in accordance with the process described in U.S. Pat. No. 3,083,551. The glass ribbon was taken up from the bath at about 700° C. and immediately fed into an annealing lehr and during the controlled cooling of the glass in the lehr the ribbon was passed through a zone of the lehr in which chlorine gas was maintained at a temperature of the order of 450° C.

The transit time of each part of the glass ribbon through the zone was about 2 minutes but the treatment with chlorine gas could vary from 1 to 5 minutes depending on the degree of tin contamination of the undersurface of the ribbon of glass. During the passage of the ribbon through the zone the stannous oxide in the glass surface was attacked by the chlorine gas and vaporized as tin chloride which vapor was carried away in the circulating atmosphere in the zone, leaving the ribbon free from the harmful tin contaminant.

Example 4

A ribbon of float glass was manufactured on a bath of molten tin in accordance with the process described in U.S. Pat. No. 3,083,551. The glass ribbon was taken up from the bath at about 650° C. and immediately fed through a zone containing an atmosphere of gaseous hydrogen chloride maintained at a pressure rather less than one atmosphere. The length of the zone through which the ribbon passed was such that the glass was within this zone for about 1 minute. The treatment time was varied by varying the speed of the ribbon or by adjusting the concentration of the gaseous hydrogen chloride. Reaction of the hydrogen chloride gas with the undersurface of the ribbon took place, resulting in vaporization of tin contaminant from the glass in the form of tin chloride vapor.

In Examples 3 and 4 it was found preferable to keep the concentration of chlorine gas or gaseous hydrogen chloride to a minimum and to vary the time of treatment to account for different degrees of contamination of the glass. This was found to reduce the rate of corrosion of the rollers carrying the glass ribbon.

It was found that the treatment of the ribbon by the process of the invention with chlorine, hydrogen chloride gas or a gaseous metal chloride could take place anywhere in the hotter part of the annealing lehr where the glass temperature is still above about 400° C.

The method of the invention can be carried out on individual sheets of flat glass cut from the ribbon of float glass manufactured by the method of U.S. Pat. No. 3,083,551, or on glass manufactured by any other method during which the glass is in contact with molten tin.

In some circumstances it was preferred to treat individual sheets of glass rather than a continuous ribbon because of the corrosion of the rollers. The treatment is preferably carried out between rollers so that the gaseous reagent could be kept away from the conveyor rollers.

The treatment of the glass surface with the gaseous reagent may be only one step in a more complex process for treating the glass surface. For example in addition to being treated with chlorine gas as described in Example 3 the glass may subsequently be maintained in a separate inert zone containing a gas such as nitrogen so that consecutive treatments of the glass in two stages are provided.

The particular advantage which is found in glass manufactured by a method according to the invention is that the "fire finish" nature of the glass surfaces is maintained after a heat treatment of the glass in an oxygen-containing atmosphere. The fact that tin picked up in the glass surface, probably in the form of stannous oxide is vaporized from the glass surface by the treatment according to the invention has made possible the maintenance of the highly polished glass surface while the impurities in that surface are removed and thereby rendered harmless.

The invention also comprehends flat glass having a tin-free polished surface, said surface having been in contact with molten tin and treated while at a temperature in the range 700° C. to 400° C. with a gaseous reagent selected from the group consisting of chlorine, hydrogen chloride gas and gaseous metal chlorides, thereby vaporizing from the glass surface in the form of tin chloride any stannous oxide content of said surface.

We claim:

1. In the manufacture of flat glass during which the glass is in contact with molten tin and thereby requires in its surface a stannous oxide content, the step of treating that surface, while the temperature of the glass is in the range 700° C. to 400° C., with a gaseous reagent selected from the group consisting of chlorine, hydrogen chloride gas, and gaseous zinc chloride, in an amount and for a time to convert substantially all of the stannous oxide to tin chloride, and vaporizing the tin chloride so formed from the glass surface.

2. A method of manufacturing flat glass in ribbon form and having a polished surface, comprising the steps of forming a ribbon of glass on a bath of molten tin, the glass thereby acquiring in its surface a stannous oxide content, taking up the ribbon of glass from the surface of the bath, advancing the ribbon of glass while the temperature of the glass is in the range 700° C. to 400° C. through a zone in which there is maintained a gaseous reagent selected from the group consisting of chlorine, hydrogen chloride gas and gaseous zinc chloride, in an amount and for a time to convert substantially all of the stannous oxide to tin chloride, and vaporizing the tin chloride so formed from the glass surface.

3. A method according to claim 2, wherein the treated hot glass is advanced from said zone through an annealing lehr.

4. A method according to claim 2, wherein said zone is an annealing lehr near the end of the lehr at which the hot ribbon of glass taken up from the surface of the bath enters the lehr.

5. A method according to claim 2, including maintaining gaseous zinc chloride in the zone at a vapor pressure of the order of 1 mm., and treating each area of the glass ribbon by the zinc chloride vapor for a time of not more than 15 minutes as the ribbon of glass is advanced through the zone.

6. A method according to claim 5, wherein nitrogen predominates in the atmosphere in the zone.

References Cited

UNITED STATES PATENTS

| | | | |
|---|---|---|---|
| 2,331,944 | 11/1943 | Pazsiczky et al. | 65—31 |
| 2,366,825 | 1/1945 | Adams | 156—24 |
| 2,461,840 | 2/1949 | Nicoll | 156—24 |
| 2,606,566 | 8/1952 | Tarnopol | 156—24X |
| 3,284,181 | 11/1966 | Harrell et al. | 65—31 |

S. LEON BASHORE, Primary Examiner

R. L. LINDSAY, Jr., Assistant Examiner

U.S. Cl. X.R.

65—31, 60, 65, 99; 117—124; 156—24

UNITED STATES PATENT OFFICE
CERTIFICATE OF CORRECTION

Patent No. 3,549,343      Dated December 22, 1970

Inventor(s) David G. Loukes and John H. Morgan

It is certified that error appears in the above-identified patent and that said Letters Patent are hereby corrected as shown below:

Column 4, line 41 "requires" should be --acquires-- line 67, before "an annealing" should be inserted --defined in--

Signed and sealed this 23rd day of March 1971.

(SEAL)
Attest:

EDWARD M. FLETCHER, JR.
Attesting Officer

WILLIAM E. SCHUYLER, JR.
Commissioner of Patents